United States Patent [19]

Leuer

[11] Patent Number: 4,999,657

[45] Date of Patent: Mar. 12, 1991

[54] METHODS AND APPARATUS FOR TAKING PORTRAITS

[76] Inventor: Thomas J. Leuer, 917 Harden St., Aurora, Ill. 60506

[21] Appl. No.: 504,599

[22] Filed: Apr. 4, 1990

[51] Int. Cl.$^5$ .............................................. G03B 13/02
[52] U.S. Cl. ...................................... 354/220; 354/295
[58] Field of Search ............... 354/220, 290, 291, 292, 354/293, 295

[56] References Cited

U.S. PATENT DOCUMENTS

| | | | |
|---|---|---|---|
| 877,283 | 1/1908 | Barrath | 354/220 |
| 1,099,820 | 6/1914 | Ridings | 354/220 |
| 1,879,949 | 9/1932 | Pinkosh | 354/220 |
| 3,893,145 | 7/1975 | King | 354/293 |
| 4,560,261 | 12/1985 | Ueda et al. | 354/220 |
| 4,771,300 | 9/1988 | Bryan | 354/220 |

Primary Examiner—L. T. Hix
Assistant Examiner—David M. Gray
Attorney, Agent, or Firm—Welsh & Katz, Ltd.

[57] ABSTRACT

A mirror is secured to a camera and adjusted so that a subject being photographed can see himself or herself in the mirror when the photograph is taken. The subject can take his or her own photograph, if desired. A mounting bracket is provided which can be secured to the camera after the camera is purchased. The mirror is easily secured to the mounting bracket for use, and can be readily removed for storage and transportation.

4 Claims, 4 Drawing Sheets

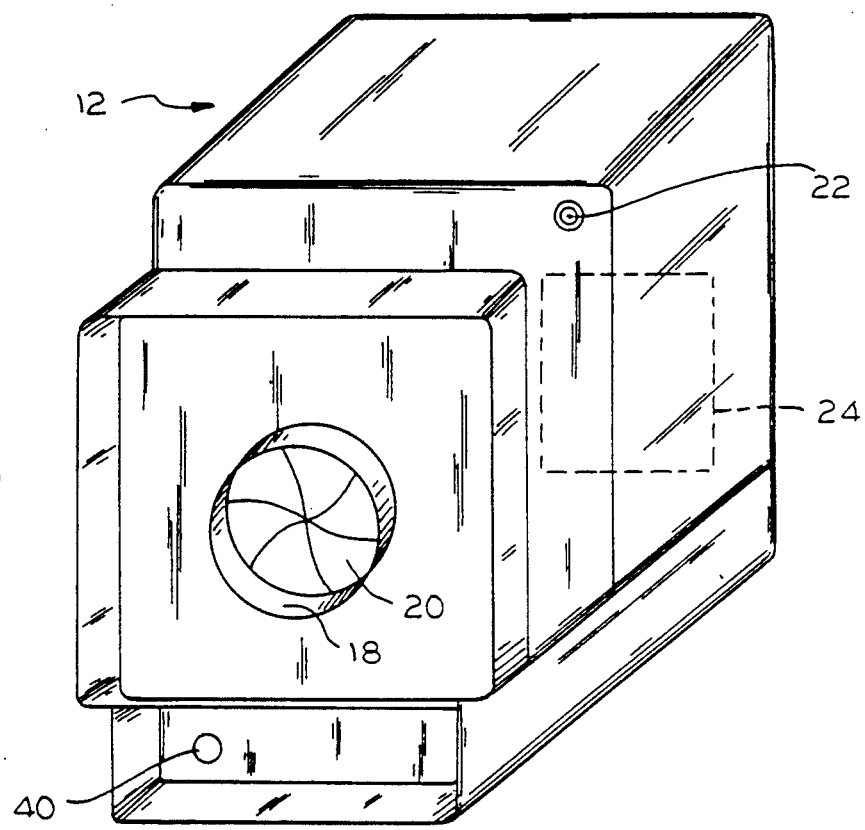
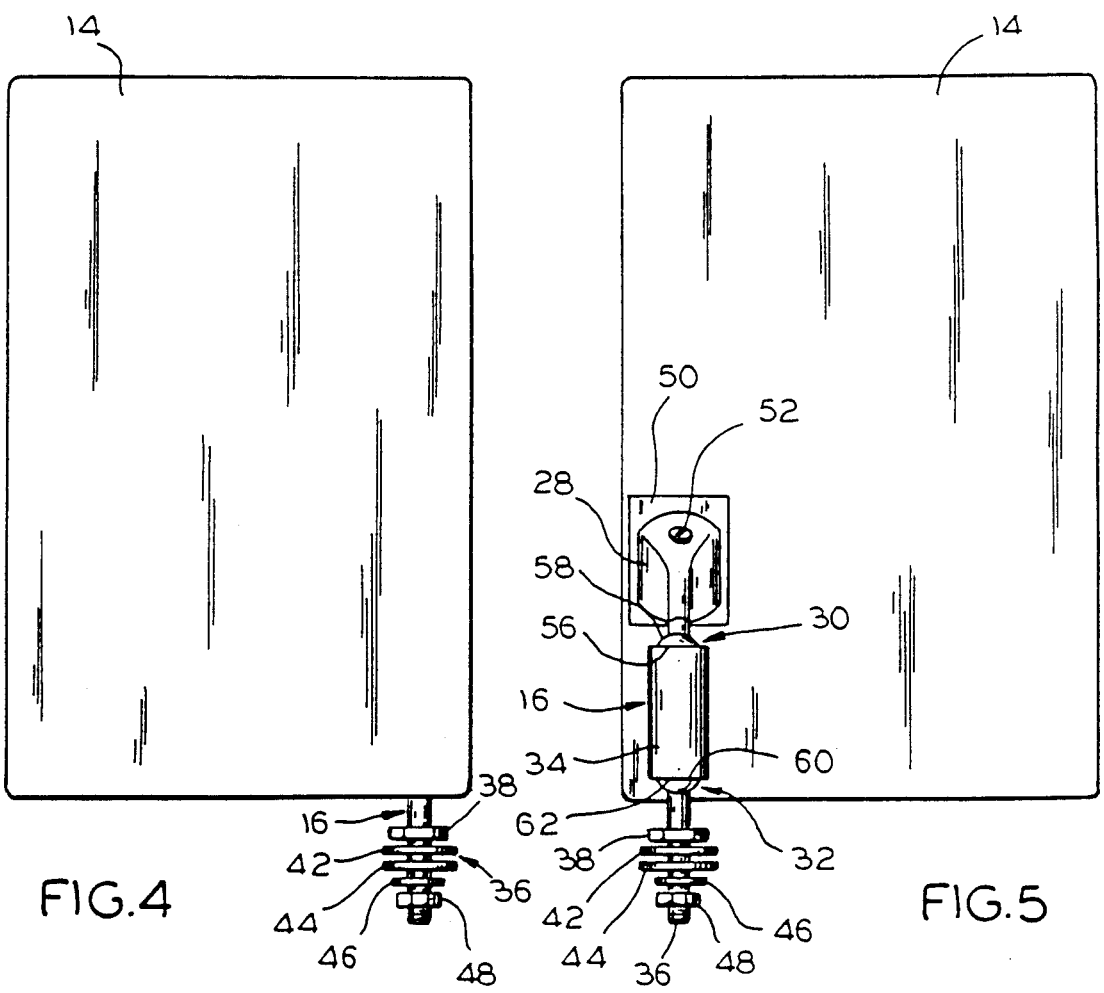

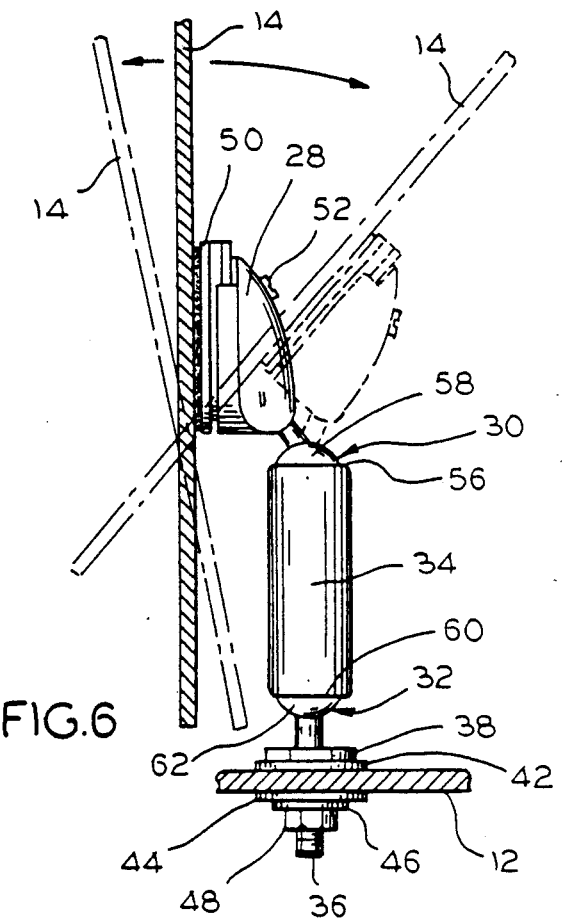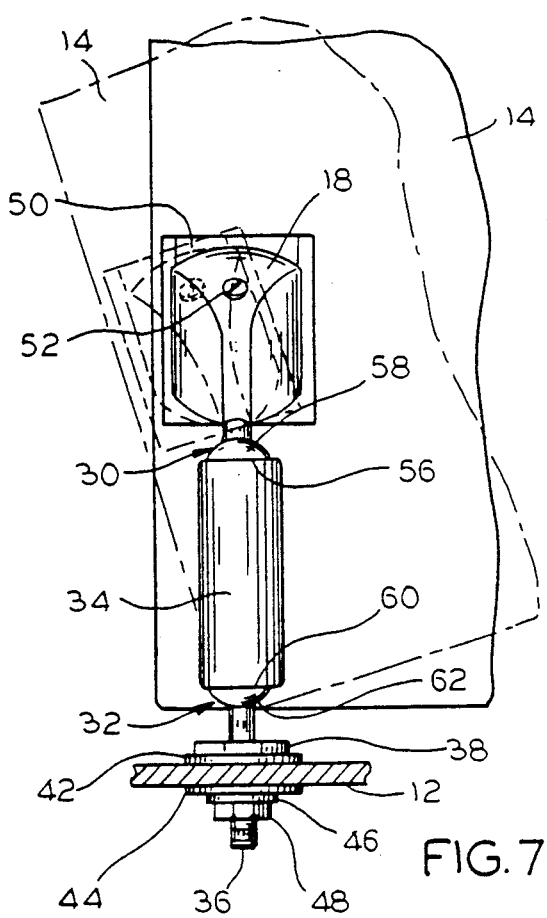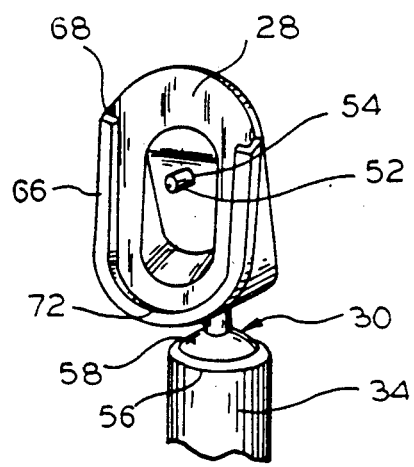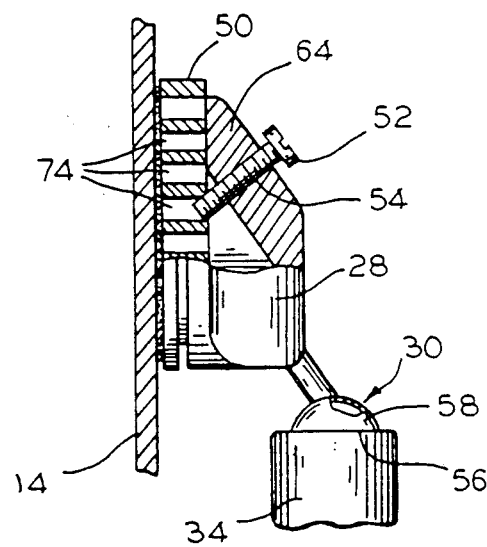

METHODS AND APPARATUS FOR TAKING PORTRAITS

This invention relates to methods and apparatus for taking portrait photographs, and more particularly, to portrait camera equipment for commercial applications where many subjects, such as students, are photographed in succession, under substantially identical conditions.

BACKGROUND OF THE INVENTION

In the field of portrait photography, numerous developments have been made which allow a photographer to see his subject better and to take better and clearer pictures. Some of these developments are used by commercial photographers who make individual photographs of many subjects, such as students, in succession. Such subjects can be photographed rapidly because they are photographed under substantially identical conditions.

Finished student and other portraits are not attractive if the subject is not properly prepared when the photograph is taken. This sometimes happens if the subject does not know what the camera will capture in the photograph, or when the photograph will be taken. Thus, there is a need for photographic methods and equipment which produce improved portrait photographs by better preparing the subject when the photograph is taken.

Multiple photographic exposures can be taken of each subject in an effort to obtain one acceptable portrait, but multiple exposures are expensive and time-consuming. Thus, there is also a need for commercial photography methods and apparatus which produce an acceptable photograph, without making multiple exposures of each subject.

Accordingly, one object of this invention is to provide new methods and apparatus for portrait photography.

Another object is to provide new methods and apparatus for self portrait photography.

Still another object is provide new methods and apparatus for making portraits and self portraits in commercial applications where many subjects, such as students, are photographed in succession, under substantially identical conditions.

A still further object is to provide new methods and apparatus which produce improved portrait and self portrait photographs by better preparing a subject when the photograph is taken.

Yet another object is to provide new portrait and self portrait methods and equipment which reduce the need for taking multiple photographs of each subject, thereby reducing the time and expense required to produce an acceptable portrait.

SUMMARY OF THE INVENTION

In keeping with one aspect of this invention, an apparatus for taking a portrait photograph of at least one subject in a selected field includes a camera for taking the photograph, and a mirror for reflecting at least a portion of the field to the subject within the field, so the subject can see himself or herself. If desired, the camera can be remotely controlled by the subject, to make self portraits. The mirror can be removably secured to the camera with a mounting bracket, and the mirror can be adjusted by moving the mirror and mounting bracket.

BRIEF DESCRIPTION OF THE DRAWINGS

The above-mentioned and other features of an embodiment of this invention and the manner of obtaining them will become more apparent, and will be best understood by reference to the following description, taken in conjunction with the accompanying drawings, in which:

FIG. 3 is a front perspective view of the apparatus of FIG. 1, with the mirror and mounting bracket detached;

FIG. 4 is a front elevational view of the mirror and mounting bracket of the apparatus of FIG. 1, removed from the camera;

FIG. 5 is a rear elevational view of the mirror and mounting bracket shown in FIG. 4;

FIG. 6 is a side elevational view of the mounting bracket of FIG. 1, with the mirror and a wall of the camera shown in cross section, illustrating one manner in which the mirror can be adjusted;

FIG. 7 is a rear elevational view of the mounting bracket of FIG. 1, with a portion of the mirror and a wall of the camera shown in cross section, illustrating another manner in which the mirror can be adjusted;

FIG. 8 is a detail view of a portion of the mounting bracket of the apparatus of FIG. 2;

FIG. 9 is a detail view, shown in partial cross section, of the upper portion of the mounting bracket of the apparatus of FIG. 1, attached to the mirror, which is shown in cross section;

DETAILED DESCRIPTION

Figure 1:
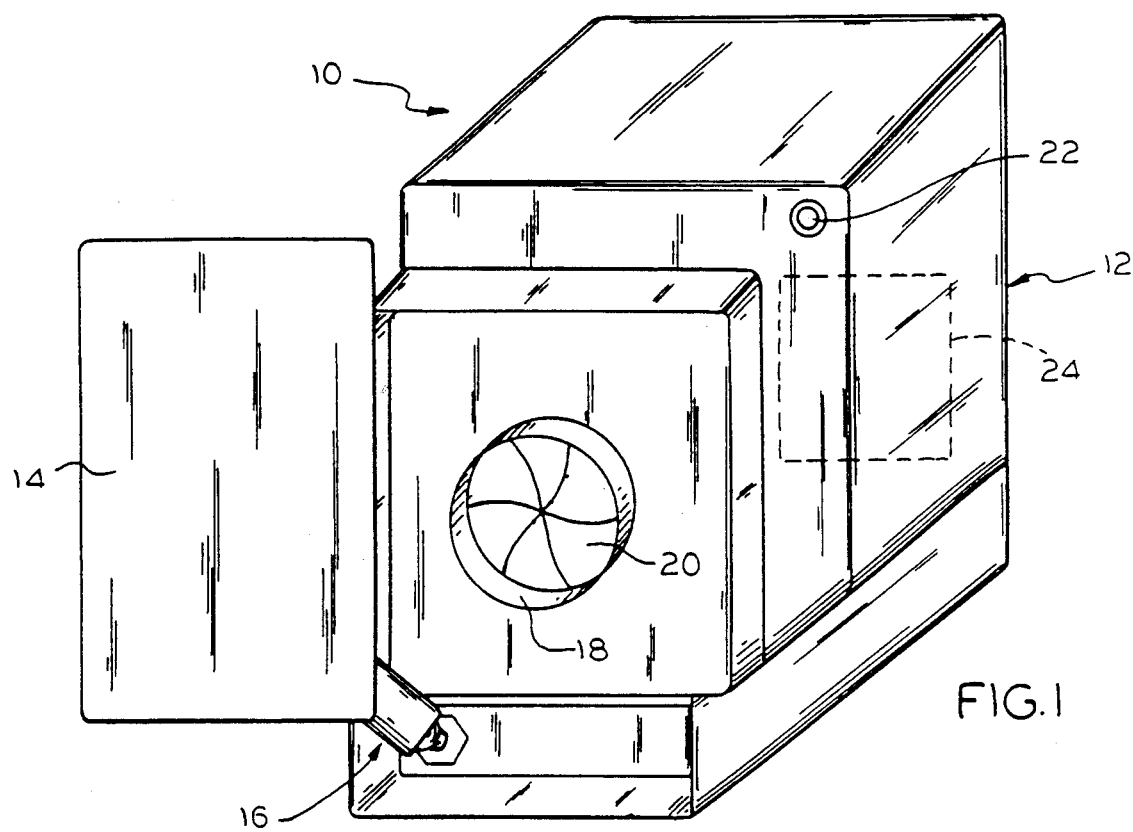
FIG. 1 is a front perspective view of apparatus made in accordance with the principles of the invention.
Figure 2:
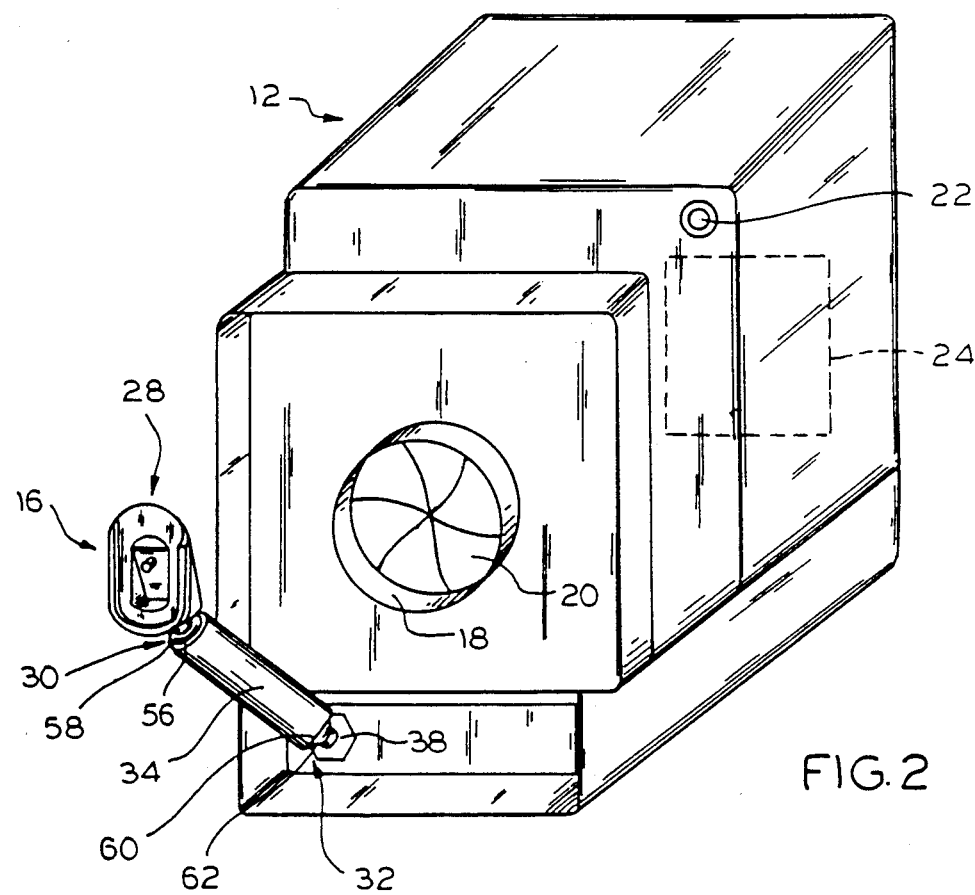
FIG. 2 is a front perspective view of the apparatus of FIG. 1, with the mirror detached.

As seen in FIGS. 1, 2, 3 and 13, apparatus 10 includes a camera 12, a mirror 14, and a mounting bracket 16 for mounting the mirror 14 on the camera 12. The camera 12 has a lens 18 through which exposures are made, a shutter 20 and a shutter switch 22 for making exposures on a film negative 24 inside the camera 12. The shutter 20 can be actuated by a camera operator, to make a portrait of a subject, or by the subject, to make a self portrait, as will be seen.

The lens 18 defines a field 26 (FIG. 13) which is photographed when the shutter 20 is opened and the film negative 24 is exposed. If several hundred students are being photographed in succession, for example, the lens 18 can be adjusted to photograph the students in the predetermined field 26, and each student can sit or stand in the field 26 to have a photograph taken. By using the same field for all of the students, the portraits can be taken rapidly, without constantly making significant adjustments to the camera equipment.

The mounting bracket 16 (FIG. 2) has a first mating half 28, first and a second ball and socket joints 30 and 32, a shaft 34, and a bolt 36 (FIG. 10) having a hexagonal head 38 for receiving a wrench. The mounting bracket 16 is secured to the camera 12 by inserting the bolt 36 through an orifice 40 in the camera 12, shown in FIG. 3, and securing the bolt 36 with first and second cushioning washers 42 and 44, a rigid washer 46 and a nut 48 (FIG. 4).

The orifice 40 can easily be drilled in a wall of many commercial cameras, and can be located in any suitable place which does not interfere with the operation of the camera or the quality of the photographs the camera produces. The lower portion of the front of the camera is a suitable place for installation of the mounting bracket for at least some cameras, as was done in the camera shown in FIG. 3. However, it is contemplated that the mounting bracket 16 could be secured to the camera 12 by external clamping or other suitable structure. The mounting bracket 16 could also be secured to a tripod or other suitable device, without being connected to the camera 12 at all, if desired. In general, it is only necessary that the subject be able to see himself or herself in the mirror 14 from the field 26, as will be described in greater detail.

The mounting bracket 16 can be installed easily. After the orifice 40 is made in the camera 12, the cushioning washer 42 is placed on the bolt 36 and the bolt 36 is placed through the first orifice 40. The cushioning washer 44 and the rigid washer 46 are placed on the bolt 36, and the nut 48 is threaded onto the end of the bolt. When the nut 48 is tightened, the mounting bracket 16 is securely attached to the camera 12.

When the mounting bracket 16 is installed, the first cushioning washer 42 is located adjacent the hexagonal end 38 of the bolt 36, on the outside of the camera 12. The second cushioning washer 44 is located on the inside of the camera 12 adjacent to the rigid washer 46 and the nut 48. In this manner, the mounting bracket 16 is firmly and evenly seated on the camera.

FIG. 5 shows the mirror 14 attached to the mounting bracket 16. A second mating half 50 is attached to the back of the mirror 14, and is designed to mate with the first mating half 28. The mating halves 28 and 50 interconnect, and are removably secured in place by a bolt 52 which passes through an orifice 54 (FIG. 9) in the first mating half 28.

As seen in FIGS. 6 and 7, the mirror 12 can be adjusted in several planes with the ball and socket joints 30 and 32. The ball and socket joints 30 and 32 are tight enough to hold the mirror 12 in a fixed position during use, but allow the operator to adjust the mirror easily.

The ball and socket joint 30 includes a socket 56 in the shaft 34 and ball 58 secured to the first mating half 28. The ball and socket joint 32 includes a socket 60 in the shaft 34 and a ball 62 secured to the bolt 36.

The first mating half 28 includes a wall 64 which is angled with respect to the mirror 14, and a wall 66 which is U-shaped (FIGS. 8 and 9). The wall 66 has an inwardly extending lip 68 which accepts a complementary groove 70 in the second mating half 50.

The wall 64 is angled so that when the bolt 52 is threaded into the orifice 54, the bolt 52 extends towards the bottom 72 of the U-shaped wall 66. With this construction, the bolt 52 more securely holds the first mating half 28 in place when the bolt 52 is tightened because the mating half 50 engages the end of the bolt 52 at the angle of the U-shaped wall 66.

When the first mating half 28 is secured to the second mating half 50, as in FIG. 9, the mating halves are secured by the bolt 52. The bolt 52 is passed through the orifice 54 and tightened into perforations 74 in the surface of the second mating half 50, thereby securing the first mating half 28 to the second mating half 50. This allows the mirror to be securely attached to the camera, yet allows it to be easily removed for storage and transportation.

Figure 10:
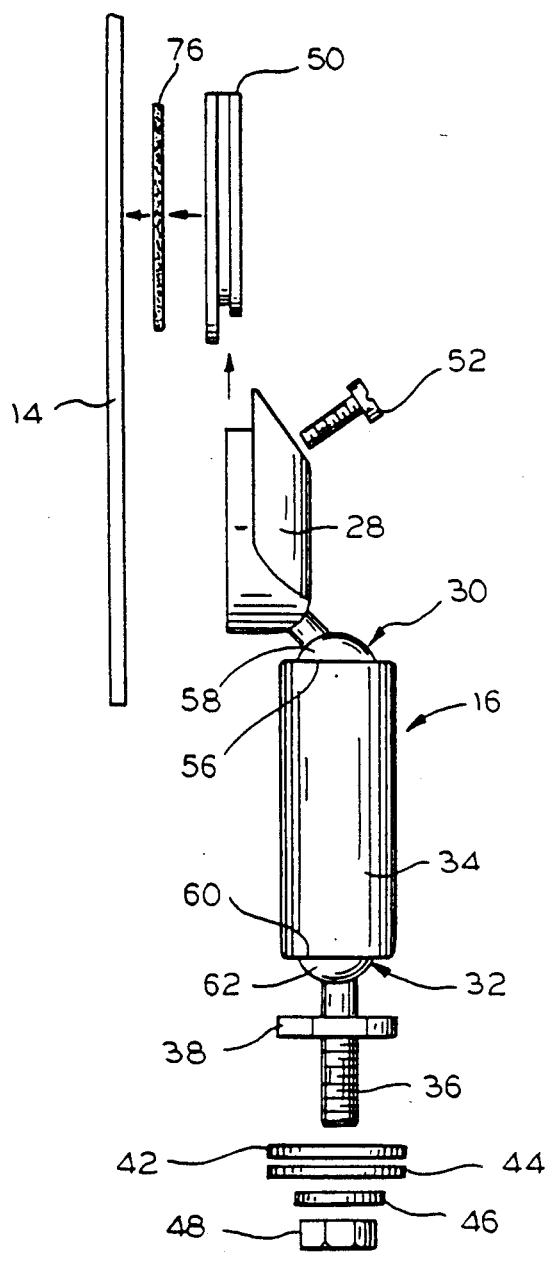
FIG. 10 is an exploded side view of the apparatus of FIG. 1.
Figure 11:
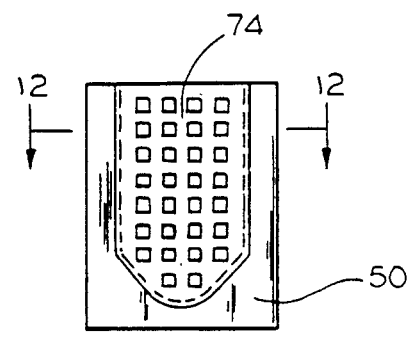
FIG. 11 is a detail view of a portion of the mounting bracket of the apparatus of FIG. 1.
Figure 12:
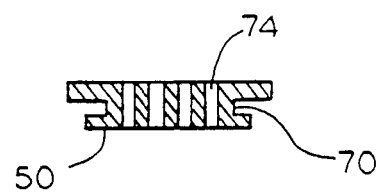
FIG. 12 is a cross sectional view of the apparatus of FIG. 11, taken along lines 12—12 of FIG. 11.

As seen in FIG. 10, the second mating half 50 is secured to the mirror 14 by a sheet 76 which has adhesive on both sides. The second mating half 50 has several perforations 74 (FIG. 11) through which some of the adhesive flows and attaches.

Figure 13:
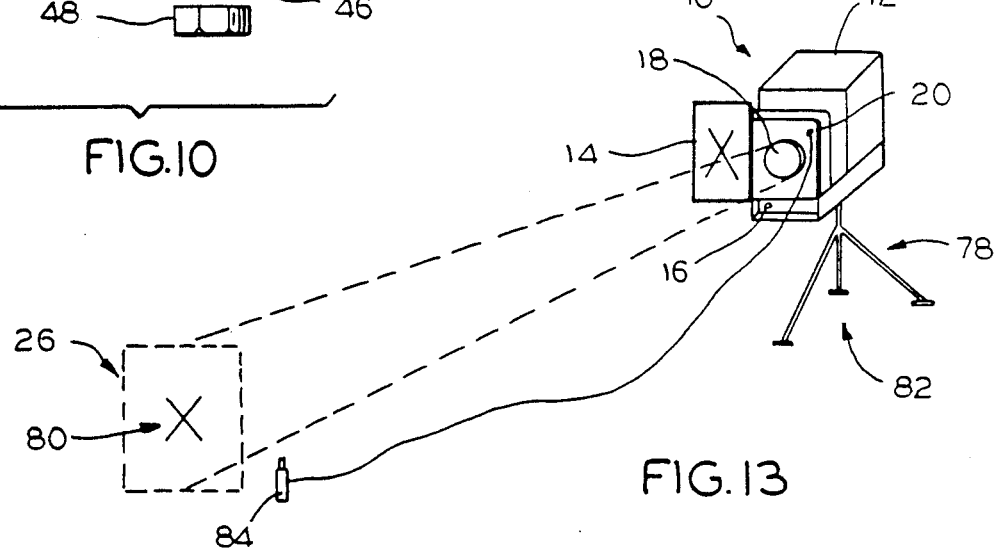
FIG. 13 is a perspective view of the apparatus of FIG. 1 in use.

FIG. 13 shows a perspective view of the apparatus 10 on a tripod 78, adjusted to take a portrait of a subject at 80. The apparatus 10 is set up at a fixed position 82 and adjusted so that the camera photographs the field 26. The subject positions himself in the field 26 and the mirror 14 is adjusted by movement of the first and second ball and socket joints 30 and 32 until the subject can view himself or herself in the mirror 14. In this manner, the subject can see what will be photographed. The subject can therefore choose his own head or body angle and facial expression. Alternatively, through means of a remote shutter control 84, the subject can also be the photographer and take a self portrait.

The mirror 14 can be placed as close to the lens 18 as possible, so that it appears in the portrait that the subject is looking directly into the lens 18. The mirror 14 could also be adjusted to create photographs in which the subject appears to be looking to one side of the lens 18.

The many advantages of this invention are now apparent. Portraits, including self portraits, can be made in commercial applications where many subjects, such as students, are photographed in succession, under substantially identical conditions. The subject is better prepared when the photograph is made because he or she can see the image which the camera will photograph before and during the time the photograph is taken. There is less need for making multiple exposures of each subject, thereby reducing the time and expense required to produce an acceptable photograph.

While the principles of the invention have been described above in connection with specific apparatus and applications, it is to be understood that this description is made only be way of example and not as a limitation on the scope of the invention.

I claim:

1. Apparatus for taking a portrait photograph of at least one subject in a selected field, said apparatus comprising
    (a) camera means for exposing a photographic negative to make an exposure;
    (b) mirror means for reflecting the field to the subject within the field; and
    (c) means for adjustably mounting said mirror means on said camera means;
    (d) said mounting means comprising a first ball and socket joint secured to aid camera means, a second ball and socket joint secured to said mirror means, and a shaft secured between said first and second ball and socket joints, said first and second ball and socket joints being tight enough to hold said mirror means in a fixed position during use, while at the same time allowing adjustment of said mirror means.

2. The apparatus of claim 1 wherein said mounting means further comprises means for removably securing said mirror means to said mounting means.

3. The apparatus of claim 2 wherein said mirror securing means comprises
    (a) two mating halves, including a first half secured to said mounting means and a second half secured to said mirror means; an
    (b) means for removably securing said first half to said second half.

4. The apparatus of claim 1 comprising means for remotely controlling the camera from within the field.

* * * * *